(12) United States Patent
Cho

(10) Patent No.: US 11,289,860 B2
(45) Date of Patent: Mar. 29, 2022

(54) UNIVERSAL SERIAL BUS DEVICE AND VEHICLE CONTAINING THE SAME

(71) Applicants: Hyundai Motor Company, Seoul (KR); Kia Motors Corporation, Seoul (KR)

(72) Inventor: Yong Sik Cho, Anyang-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 23 days.

(21) Appl. No.: 17/095,004

(22) Filed: Nov. 11, 2020

(65) Prior Publication Data

US 2021/0408742 A1 Dec. 30, 2021

(30) Foreign Application Priority Data

Jun. 25, 2020 (KR) .................. 10-2020-0077600

(51) Int. Cl.
*G06F 13/42* (2006.01)
*H01R 25/00* (2006.01)
*G06F 1/26* (2006.01)
*H01R 13/60* (2006.01)
*H01R 13/447* (2006.01)
*B60R 16/033* (2006.01)
*H02J 7/00* (2006.01)
*H01R 13/717* (2006.01)
*H01R 13/66* (2006.01)

(52) U.S. Cl.
CPC ......... *H01R 25/006* (2013.01); *B60R 16/033* (2013.01); *G06F 1/266* (2013.01); *G06F 13/4282* (2013.01); *H01R 13/447* (2013.01); *H01R 13/60* (2013.01); *G06F 2213/0042* (2013.01); *H01R 13/665* (2013.01); *H01R 13/7175* (2013.01); *H01R 2201/26* (2013.01); *H02J 7/0045* (2013.01)

(58) Field of Classification Search
CPC ................. G06F 13/4282; G06F 1/266; G06F 2213/0042; H01R 25/006; H01R 13/60; H01R 13/447; H01R 2201/26; H01R 13/7175; B60R 16/033
See application file for complete search history.

(56) References Cited

U.S. PATENT DOCUMENTS

| | | | | |
|---|---|---|---|---|
| 7,997,937 B2* | 8/2011 | Kondo | ................... | H01R 24/62 439/660 |
| 10,439,326 B2* | 10/2019 | Yang | ................... | H01R 13/7035 |
| 2015/0326047 A1* | 11/2015 | Chung | ................... | H02J 7/00 320/162 |

(Continued)

*Primary Examiner* — Henry Tsai
*Assistant Examiner* — Christopher A Daley
(74) *Attorney, Agent, or Firm* — Morgan, Lewis & Bockius LLP

(57) ABSTRACT

A universal serial includes a main body including a plurality of USB (Universal Serial Bus) terminals disposed on a circumference of an upper and a side surface of a housing, a storage portion that is buried inside an interior trim to accommodate the main body in an inner space and a cable that electrically connects a power supply and the main body, and wherein the main body is used in a state connected to the storage portion or moved to a state separated from the storage portion and connected to at least one smart device through the plurality of USB terminals.

16 Claims, 8 Drawing Sheets

(56) References Cited

U.S. PATENT DOCUMENTS

2016/0091942 A1* 3/2016 Park .................. G06F 1/266
                                                                   713/310
2021/0188115 A1* 6/2021 Kazuno ............... B60L 53/14

\* cited by examiner

FIG. 5A
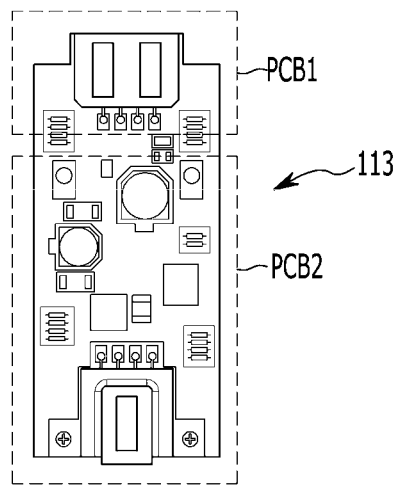
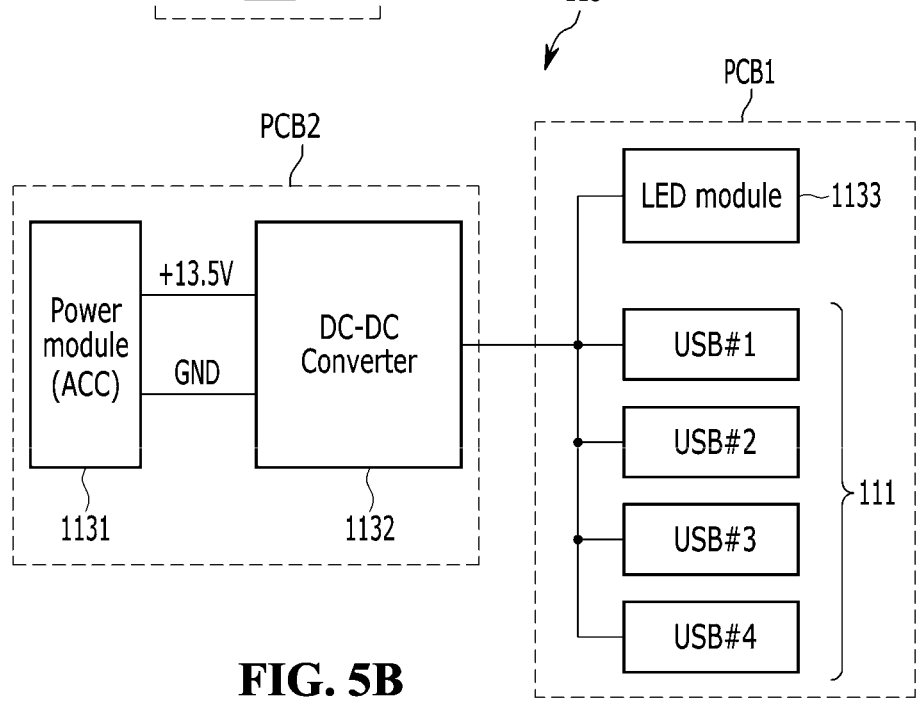
FIG. 5B

UNIVERSAL SERIAL BUS DEVICE AND VEHICLE CONTAINING THE SAME

CROSS-REFERENCE TO RELATED APPLICATION

This application claims priority to and the benefit of Korean Patent Application No. 10-2020-0077600 filed in the Korean Intellectual Property Office on Jun. 25, 2020, the entire contents of which are incorporated herein by reference.

BACKGROUND OF THE INVENTION

(a) Field of the Invention

The present invention relates to a universal serial bus device for a vehicle and a vehicle including the same. More particularly, the present invention relates to a universal serial bus device for expanding the number of USB terminals a vehicle including the same.

(b) Description of the Related Art

In general, a vehicle is equipped with a universal serial bus (USB) terminal that provides interworking and charging functions with a user's smart device.

Conventional USB terminals are installed in the vicinity of the center fascia of the driver's seat or in the interior trim parts of the air conditioner vents in the rear seat, considering the user's convenience, since there are restrictions on package and design requirements in the vehicle.

Meanwhile, due to the recent increase in the use of smart devices, customer demands for an increase in the number of USB terminals in vehicles are continuously increasing. For example, many customers purchase and use accessories that are inserted into the cigar jack holder separately to increase the number of USB terminals. However, the interior environment and design of the vehicle are deteriorated due to the exterior and complex wiring of accessories protruding from the interior trim, resulting in customer complaints.

However, in order to increase the number of USB terminals in a vehicle, there is a drawback that is disadvantageous to the in-vehicle package and design marketability. In addition, there is a disadvantageous problem in cost increase and assemble productivity due to the increase in the number of parts of the USB terminal and the complexity of the connection via hole group.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a universal serial bus for a vehicle that can be used by connecting a plurality of smart devices in various seat positions by installing the main body unit including a plurality of USB terminals to be detachably movable from the receiving unit.

A universal serial bus according to an exemplary embodiment of the present invention may include a main body including a plurality of USB (Universal Serial Bus) terminals disposed on a circumference of an upper and a side surface of a housing, a storage portion that is buried inside an interior trim to accommodate the main body in an inner space and a cable that electrically connects a power supply and the main body, and wherein the main body is used in a state connected to the storage portion or moved to a state separated from the storage portion and connected to at least one smart device through the plurality of USB terminals.

The main body may expose only the USB terminal installed on the upper surface when it is connected to the storage portion, and exposes all of the USB terminal disposed on the external circumferential surface when separated from the storage portion.

The storage portion may include a stop protrusion in which the main body is settled when combined, and a storage space provided under the stop protrusion to accommodate the cable.

The cable may be a spring cable with an elastic structure wound in a ring shape, so that when the main body moves, it increases or decreases in length.

The main body and the storage portion may be combined or separated by any one of a cover combination type, a hook combination type, a friction combination type, a rotation combination type, and a push-up button combination type.

The main body may include a circuit portion electrically connected to the plurality of USB terminals to supply power through the cable, and a USB connector to connect the circuit portion and the cable.

The circuit portion may charge the power to a battery built into the main body, and the circuit portion may supply the power of the battery to the smart device connected to the USB terminal when the cable and the connected USB connector are disconnected.

The circuit portion may include a power module connected to a power supply, a DC-DC converter for converting a DC power of the vehicle to USB standard DC power, the plurality of USB terminals disposed of in parallel circuit and outputting the same voltage of the standard, and an LED module that displays the connection status of the plurality of USB terminals and the smart device.

The plurality of USB terminal may be a bus structure data line that connects the smart device and vehicle communication through the in parallel circuit to transmit data.

The circuit portion may be separated into a first PCB circuit including the plurality of USB terminals and an LED module, and a second PCB circuit including the power module and DC-DC converter.

The first PCB circuit may be installed in the main body, and the second PCB circuit, which has a relatively complex circuit and a larger size compared to the first PCB circuit, may be installed in the storage portion.

The first PCB circuit may be formed in the shape of any one of a cross column, a square column, and a triangle column.

The main body and the storage portion may be matched with the shape of the first PCB circuit, respectively, to form in the shape of any one of a cylinder column, a square column type and a triangular column.

The storage portion may include various kinds of USB genders provided according to the type of smart, wherein the cable is connected to the smart device after the main body and the USB are separated, and the USB gender is connected.

A vehicle according to an exemplary embodiment of the present invention may include a universal serial bus including a main body including a plurality of USB (Universal Serial Bus) terminals disposed on a circumference of an upper and a side surface of a housing, a storage portion that is buried inside an interior trim to accommodate the main body in an inner space, and a cable that electrically connects a power supply and the main body, and wherein the main body may be used in a state connected to the storage portion or moved to a state separated from the storage portion and connected to at least one smart device through the plurality of USB terminals.

The universal serial bus may be installed in at least one of an indoor dashboard and a console box.

According to an exemplary embodiment of the present invention, the user can connect the cable through the USB gender according to the device type to the smart device without having to carry a separate smart device connection cable, thereby improving customer convenience.

In addition, since the main body equipped with a plurality of USB terminals can be separated from the storage portion and moved to a desired position of the user, the smart device can be connected without restrictions of the cable length.

In addition, since the main body including the built-in battery can be separated from the cable of the storage portion to be portable, there is an effect of improving customer convenience and marketability by providing an auxiliary battery function.

In addition, since the USB gender and cable are provided in the storage portion, the user can connect the cable through the USB gender according to the device type to the smart device without having to carry a separate smart device connection cable, thus improving customer convenience.

BRIEF DESCRIPTION OF THE DRAWINGS

FIG. 5 shows a configuration of a separated circuit part according to circuit optimization according to an embodiment of the present invention.

DESCRIPTION OF SYMBOLS

Figure 1:
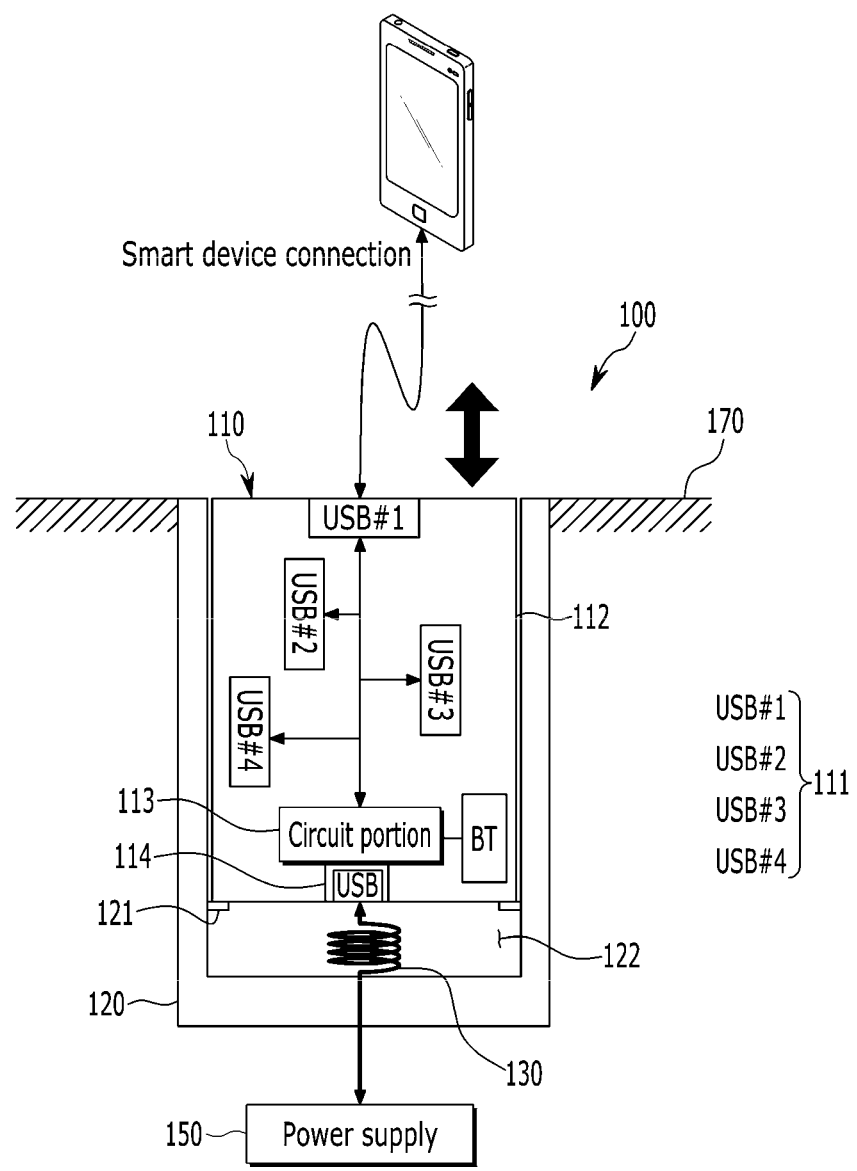
FIG. 1 is a block diagram showing a universal serial bus for a vehicle according to an exemplary embodiment of the present invention.

100: universal serial bus (USB) device
110: main body
111: USB terminal (USB#1, USB#2, USB#3, USB#4)
112: housing
1131: power module
1133: LED module
120: storage portion
122: storage space
113: circuit portion
1132: DC-DC converter
114: USB connector
121: stop protrusion
123: cover
124a: locking portion
125: friction portion
Z#1, Z#2, Z#3: USB genders
150: power supply
124b: hook
130: cable
BT: battery

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the specification, terms such as first, second, A, B, (a) and (b) may be used to describe various elements, but the elements should not be limited by the terms. These terms are only used to distinguish the constituent element from other constituent elements, and the nature, order, or order of the constituent element is not limited by the term.

Throughout the specification, when a component is referred to as 'being 'connected' or 'connected' to another component, it may be directly connected or connected to the other component, but It should be understood that other components may exist in the middle. On the other hand, when a constituent element is referred to as 'directly connected to' or 'directly connected' to another constituent element, it should be understood that there is no other constituent element in the middle.

Throughout the specification, terms used are only used to describe specific embodiments, and are not intended to limit the present invention. Singular expressions include plural expressions unless the context clearly indicates otherwise.

Throughout the specification, terms related to 'comprise', 'have', etc. are intended to designate the presence of features, numbers, steps, actions, components, parts, or combinations thereof described in the specification, and it is to be understood that it does not preclude the possibility of the presence or addition of one or more other features or numbers, steps, actions, components, parts, or combinations thereof.

Unless otherwise defined herein, all terms including technical or scientific terms used herein have the same meaning as commonly understood by one of ordinary skill in the art to which the present invention belongs. Terms such as those defined in a commonly used dictionary should be interpreted as being consistent with the meaning in the context of the related technology, and are not interpreted in an ideal or excessively formal meaning unless explicitly defined in the present specification.

A universal serial bus device for a vehicle according to an embodiment of the present invention and a vehicle including the same will be described in detail with reference to the drawings.

FIG. 1 is a block diagram showing a universal serial bus for a vehicle according to an exemplary embodiment of the present invention.

Figure 2:
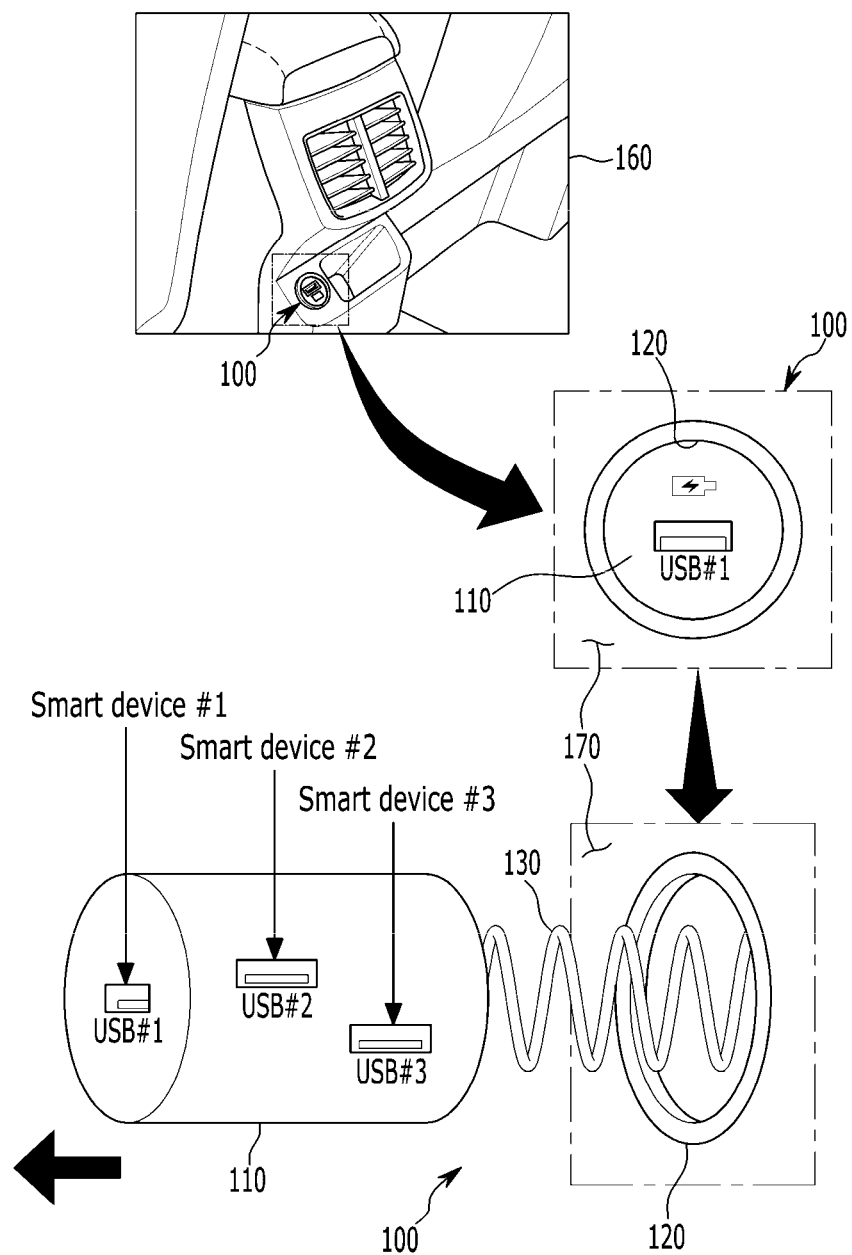
FIG. 2 is a schematic view showing the state of use of a universal serial bus for a vehicle according to an exemplary embodiment of the present invention.
Figure 3A:
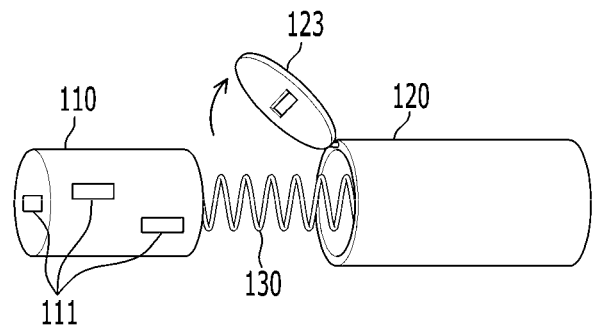
FIG. 3 shows various coupling methods of a main body and a storage portion according to an exemplary embodiment of the present invention.
Figure 3B:
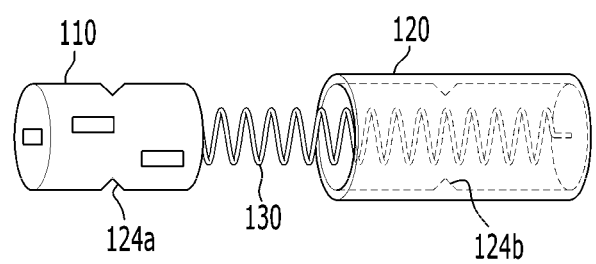
Figure 3C:
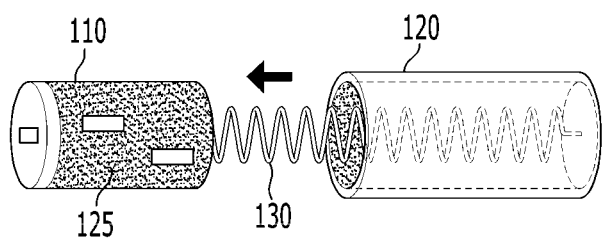
Figure 3D:
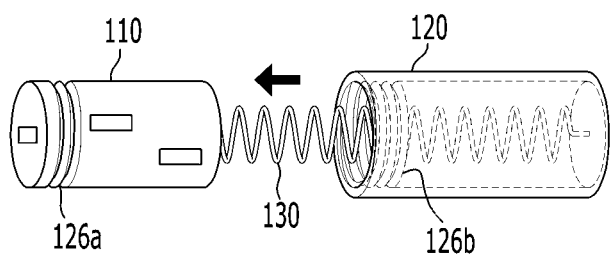

FIG. 2 is a schematic view showing the state of use of a universal serial bus for a vehicle according to an exemplary embodiment of the present invention.

Referring to FIG. 1 and FIG. 2, a universal serial bus (hereinafter referred to as USB) device 100 according to an exemplary embodiment of the present invention includes a main body 110 including a plurality of USB terminals 111 disposed on a circumference of an upper and a side surface of a housing 112, a storage portion 120 that is buried inside an interior trim 170 to accommodate the main body 110 in an inner space, and a cable 130 that electrically connects a power supply 150 and the main body 110.

The USB device 100 is mounted on the interior trim parts such as the vehicle's interior dashboard or console box, for example as shown in FIG. 2, it can be installed in the built-in trim of the rear air conditioner vent 160.

The main body 110 is used in a state coupled to the storage portion 120 or separated from the storage portion 120 and moved to a desired position by the user to supply power to at least one smart device using a plurality of USB terminals 111 or supports vehicle communication. The smart device may be a smart phone, a tablet PC, a laptop, a portable game device, a Bluetooth earphone, a smart watch, a smart goggle and a wearable terminal.

The main body 110 includes a cylinder-type housing 112 in which a plurality of USB terminals 111 are installed, and a circuit portion 113 that is electrically connected to a plurality of USB terminals 111 and supplies power through the cable 130.

For example, the housing 112 of the main body 110 includes a first USB terminal (USB #1) disposed on the upper surface of the housing 112, a second USB terminal (USB #2), a third USB terminal (USB #3) and a fourth USB terminal (USB #4) disposed at the external circumference of the housing 112. The second USB terminal (USB #2), the third USB terminal (USB #3) and the fourth USB terminal (USB #4) may be arranged at predetermined intervals along the outer peripheral surface of the housing 112. The number of configurations and the install position of the USB terminal 111 configured in the housing 112 of the main body 110 are not limited above and can be changed according to various designs.

The main body 110 exposes only the first USB terminal (USB #1) to the outside while being coupled to the internal space of the storage portion 120.

In addition, when the main body 110 is separated from the internal space of the storage portion 120, the first USB terminal (USB #1), the second USB terminal (USB #2), the third USB terminal (USB #3) and the fourth USB terminal (USB #) may be exposed. In this case, the main body 110 may be connected to a plurality of smart devices through a plurality of USB terminals 111.

The circuit portion 113 may be communication interface for connecting vehicle communication as well as power supplying through a plurality of USB terminals 111, and may connect vehicle communication with a vehicle terminal such as an AVN (Audio, Video, Navigation).

The cable 130 may be a spring cable with an elastic structure wound in a ring shape, so that when the main body 110 moves, it increases or decreases in length.

Therefore, the main body 110 can be moved to a desired position for each seat of the user by extending the length of the cable 130 while being separated from the storage portion 120. Thus, no matter where the user is positioned in any seat in the vehicle, there is an advantage that the separated main body 110 can be moved to a desired position and used after connecting a smart device.

The circuit portion 113 may charge power to a battery BT built in the main body 110, and when the separate USB connector 114 connected to the cable 130 is disconnected, the power of the battery BT can be supplied to a smart device connected to the USB terminal 111. For example, the battery may be a small super capacitor having a large storage capacity. The main body 110 may be completely disconnected from the cable 130 and the USB connector 114 so that the user can carry the main body 110 outside the vehicle and can serve as an auxiliary battery in an emergency situation.

The storage portion 120 includes a stop protrusion 121 in which the inserted main body 110 is seated, and a storage space 122 provided under the stop protrusion 121 to receive the cable 130.

The interior circumference formed inside the storage portion 120 may be configured in the same shape matching the shape of the main body 110.

FIG. 3 shows various coupling methods of a main body and a storage portion according to an exemplary embodiment of the present invention.

Referring to FIG. 3, in an exemplary embodiment of the present invention, the vehicle USB device 100 has any combination type of a cover combination type (A), a hook combination type (B), a friction combination type (C) and a rotation combination type (D).

The cover combination type (A) can be configured by inserting the main body 110 into the storage portion 120, closing the cover 123, and opening the cover 123 to separate the main body 110 from the storage portion 120.

The hook combination type (B) may be configured in such a way that a locking portion 124a formed on the external circumference of the main body 110 is caught and fixed by a locking hook 124b formed on the interior circumference of the storage portion 120 when coupled.

The friction combination type (C) may be configured in such a way that the main body 110 and the storage portion 120 are fixed using the fitting friction force of the friction portion 125 formed on the external circumference of the main body 110 and the interior circumference of the storage portion 120, respectively, when combined.

The rotation combination type (D) may be configured by combining a spiral protrusion 126a formed on the external circumference of the main body 110 to a spiral groove 126b formed in the interior circumference of the storage portion 120 when combined.

In addition, the vehicle USB device 100 may be further implemented in a combination type of a push-up button type. For example, when the main body 110 is pressed in the coupled state, the coupling with the storage portion 120 is released, and a part of the main body 110 is protruded outside the interior trim 170, and when pressed again, it can be mechanically fastened.

Figure 4:
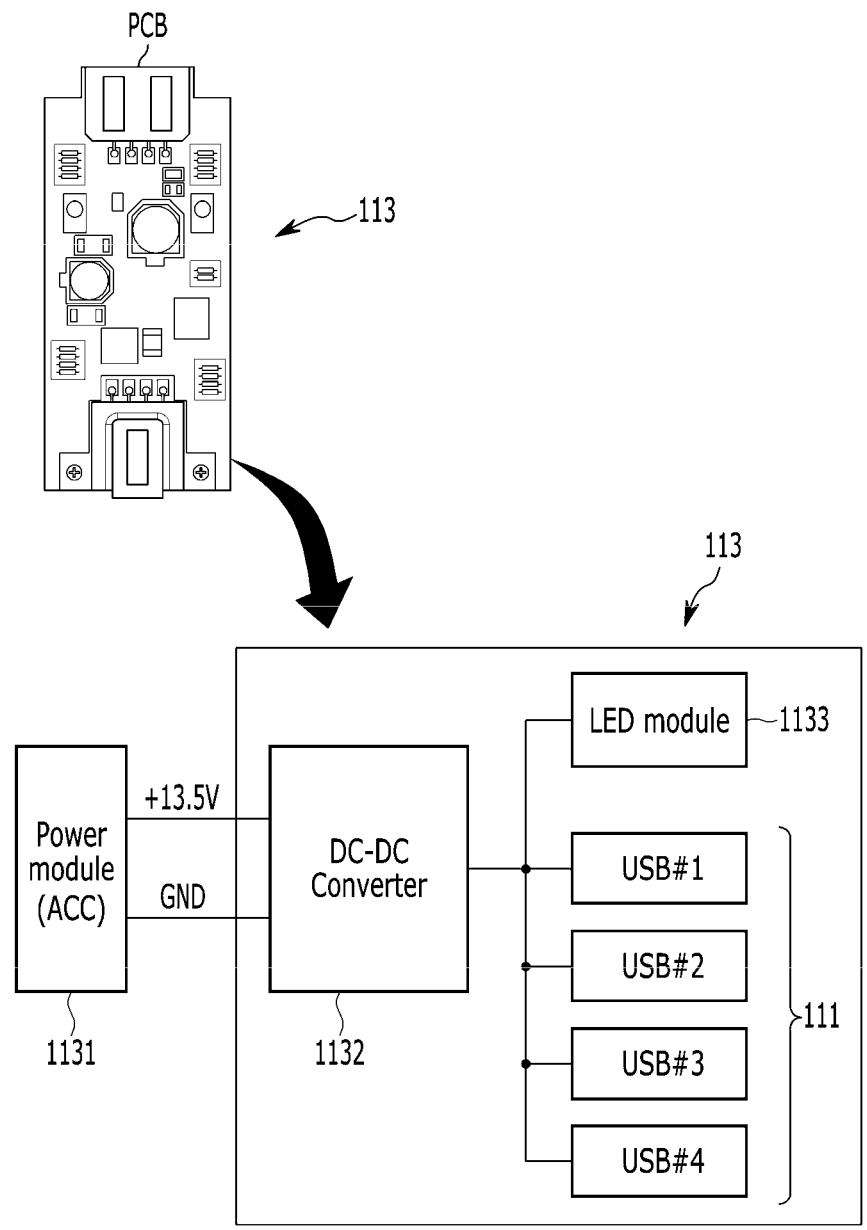
FIG. 4 schematically shows the configuration of a circuit unit according to an exemplary embodiment of the present invention.

FIG. 4 schematically shows the configuration of a circuit unit according to an exemplary embodiment of the present invention.

Referring to FIG. 4, the circuit portion 113 according to an exemplary embodiment of the present invention is installed inside the main body 110 in a form in which various elements are integrated on a printed circuit board (PCB).

The circuit portion 113 may include a power module 1131 connected to the power supply 150 (referring to FIG. 1), a DC-DC converter 1132 for converting a DC power of the vehicle to USB standard DC power; the plurality of USB terminals 111 disposed of in parallel circuit and outputting the same voltage of the standard, and an LED module 1133 that displays the connection status of the plurality of USB terminal 111 and the smart device.

The plurality of USB terminals 111 are bus-structured data lines and can transmit data through parallel circuit configuration.

Here, since the circuit unit 113 includes a plurality of USB terminals 111, the size of the main body 110 may be increased, and thus, circuit optimization is required to satisfy package constraints such as design of a vehicle and a space limitation.

FIG. 5 shows a configuration of a separated circuit part according to circuit optimization according to an embodiment of the present invention.

Referring to FIG. 5, the circuit portion 113 is divided into a first PCB circuit PCB1 implemented in the main body 110 and a second PCB circuit PCB2 implemented in the storage portion 120 to show the optimized state for the package.

The first PCB circuit PCB1 is installed in the main body 110 including a plurality of USB terminals 111 and LED module 1133. The first PCB circuit PCB1 may further include the battery BT built into the main body 110 described above to perform a portable auxiliary battery function.

The second PCB circuit PCB2 is installed in the storage portion 120 including the power module 1131 and DC-DC converter 1132.

As such, the USB device 100 requires a large number of circuit elements in order to convert the vehicle's DC power into a DC power suitable for USB, and a heat sink considering the heat capacity generated therefrom is required and thus the DC-DC converter 1132 with a large size is implemented in the storage portion 120. In addition, the USB device 100 for the vehicle can optimize its size by configuring only the basic connection circuit in the main body 110 together with a plurality of USB terminals 111 and LED module 1133.

FIG. 6 shows examples of various PCB1 implementations of the main body according to an exemplary embodiment of the present invention.

Figure 7A:
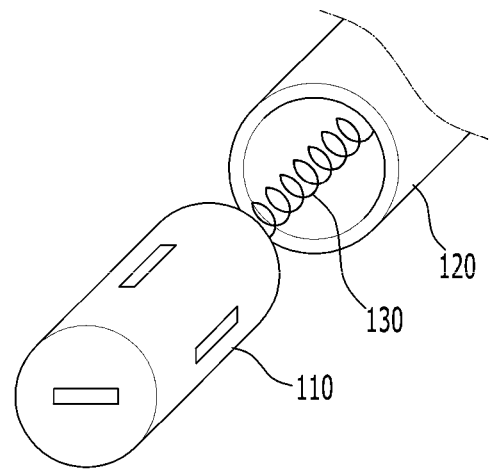
FIG. 7 shows examples of implementing various design shapes of the main body and a storage portion according to an exemplary embodiment of the present invention.
Figure 7B:
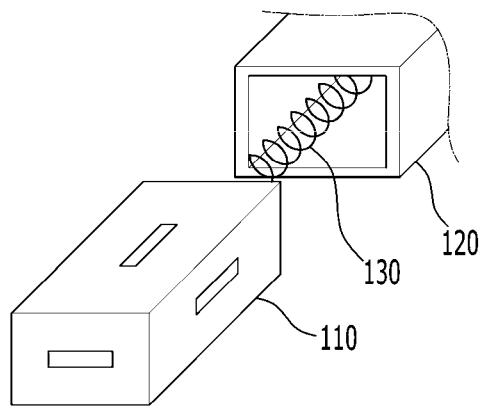

FIG. 7 shows examples of implementing various design shapes of the main body and a storage portion according to an exemplary embodiment of the present invention.

Figure 6A:
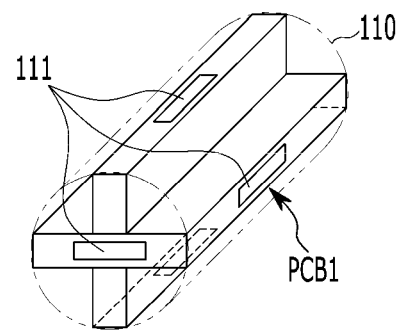
FIG. 6 shows examples of various PCB1 implementations of the main body according to an exemplary embodiment of the present invention.
Figure 6B:
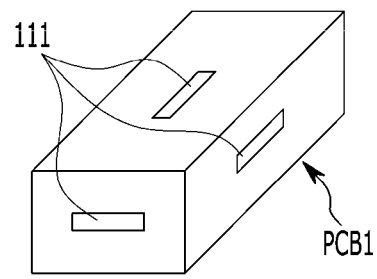
Figure 6C:
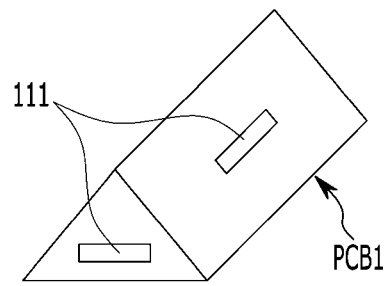

FIG. 6 and referring to FIG. 7, the PCB1 for applying the plurality of USB terminal 111 to the main body 110 according to an exemplary embodiment of the present invention may be implemented by any one of a cross column type (FIG. 6A), a square column type (FIG. 6B) and a triangular column type (FIG. 6C) Can be implemented.

Figure 7C:
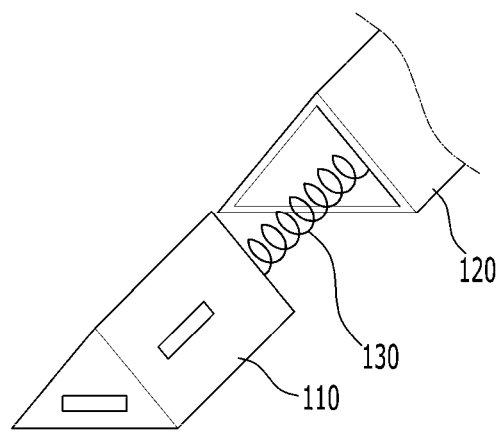

The design shape of the main body 110 and the storage portion 120 matched to the various shapes of the PCB1 can be implemented in one of a cylinder type (FIG. 7A), a square column type (FIG. 7B), and a triangular column type (FIG. 7C).

The shape of the main body 110 and the storage portion 120 can be selectively applied according to the internal trim part in which the USB device 100 is installed.

As described above, according to an exemplary embodiment of the present invention, it is possible to support a user to simultaneously use several USB terminals with a single USB device without the need to dispose several USB terminals throughout the vehicle. Therefore, while satisfying vehicle design and package requirements, there is an effect that is easy to produce assemble.

In addition, since the main body equipped with a plurality of USB terminals can be separated from the storage portion and moved to a desired position of the user, the smart device can be connected without restrictions of the cable length.

In addition, since the main body including the built-in battery can be separated from the cable of the storage portion to be portable, there is an effect of improving customer convenience and marketability by providing an auxiliary battery function.

In the above, an exemplary embodiment of the present invention has been described, but the present invention is not limited to the above exemplary embodiment, and various additional modifications are possible.

Figure 8:
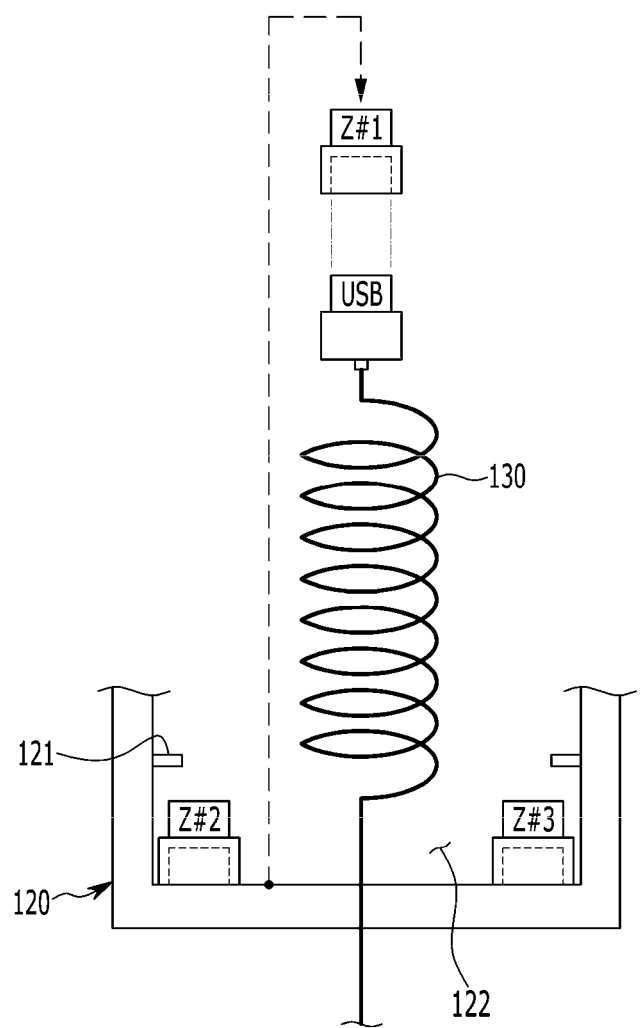
FIG. 8 shows a state in which a plurality of smart device genders are provided in the storage space according to a further exemplary embodiment of the present invention.

For example, FIG. 8 shows a state in which a plurality of USB genders are provided in a storage space according to a further exemplary embodiment of the present invention.

Referring to FIG. 8, a storage portion 120 according to an additional exemplary embodiment of the present invention includes various kinds of USB genders Z #1, Z #2, and Z #3 provided according to the type of smart device in the storage space 122.

For example, the various kinds of USB genders Z #1, Z #2, and Z #3 include a USB terminal to which a cable 130 is connected and a connector to which smart devices are connected to the front, and the connector can be equipped with A-type, C-type and Lightning 8-pin (for Apple) depending on the number and design of pins.

The cable 130 is connected to the smart device after the main body 110 and the USB are separated, and the USB gender is connected.

Therefore, the user can connect the cable 130 through the USB gender according to the device type to the smart device without having to carry a separate smart device connection cable, thereby improving customer convenience.

An exemplary embodiment of the present invention is not implemented only through the apparatus and/or method described above, but a program for realizing a function corresponding to the configuration of an exemplary embodiment of the present invention, and a recording medium in which the program is recorded. It may be implemented through, etc., such an implementation can be easily implemented by an expert in the technical field to which the present invention belongs from the description of the exemplary embodiment described above.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A universal serial bus for a vehicle comprising:
   a main body including a plurality of USB (Universal Serial Bus) terminals disposed on a circumference of an upper and a side surface of a housing;
   a storage portion that is buried inside an interior trim to accommodate the main body in an inner space; and
   a cable that electrically connects a power supply and the main body, and
   wherein the main body is used in a state connected to the storage portion or moved to a state separated from the storage portion and connected to at least one smart device through the plurality of USB terminals.

2. The universal serial bus of claim 1, wherein the main body exposes only the USB terminal installed on the upper surface when it is connected to the storage portion, and exposes all of the USB terminal disposed on the external circumferential surface when separated from the storage portion.

3. The universal serial bus of claim 1, wherein the storage portion comprises:
- a stop protrusion in which the main body is settled when combined; and
- a storage space provided under the stop protrusion to accommodate the cable.

4. The universal serial bus of claim 3, wherein the cable is a spring cable with an elastic structure wound in a ring shape, so that when the main body moves, it increases or decreases in length.

5. The universal serial bus of claim 1, wherein the main body and the storage portion are combined or separated by any one of a cover combination type, a hook combination type, a friction combination type, a rotation combination type, and a push-up button combination type.

6. The universal serial bus of claim 1, wherein the main body comprises:
- a circuit portion electrically connected to the plurality of USB terminals to supply power through the cable; and
- a USB connector to connect the circuit portion and the cable.

7. The universal serial bus of claim 6, wherein the circuit portion charges the power to a battery built into the main body, and
the circuit portion supplies the power of the battery to the smart device connected to the USB terminal when the cable and the connected USB connector are disconnected.

8. The universal serial bus of claim 6, wherein the circuit portion comprises:
- a power module connected to a power supply;
- a DC-DC converter for converting a DC power of the vehicle to USB standard DC power;
- the plurality of USB terminals disposed of in parallel circuit and outputting the same voltage of the standard; and
- an LED module that displays the connection status of the plurality of USB terminals and the smart device.

9. The universal serial bus of claim 6, wherein the plurality of USB terminal is a bus structure data line that connects the smart device and vehicle communication through the in parallel circuit to transmit data.

10. The universal serial bus of claim 8, wherein the circuit portion is separated into a first PCB circuit including the plurality of USB terminals and an LED module, and a second PCB circuit including the power module and DC-DC converter.

11. The universal serial bus of claim 10, wherein the first PCB circuit is installed in the main body, and the second PCB circuit, which has a relatively complex circuit and a larger size compared to the first PCB circuit, is installed in the storage portion.

12. The universal serial bus of claim 11, wherein the first PCB circuit is formed in the shape of any one of a cross column, a square column, and a triangle column.

13. The universal serial bus of claim 12, wherein the main body and the storage portion are matched with the shape of the first PCB circuit, respectively, to form in the shape of any one of a cylinder column, a square column type and a triangular column.

14. The universal serial bus of claim 5, wherein:
the storage portion includes various kinds of USB genders provided according to the type of smart,
wherein the cable is connected to the smart device after the main body and the USB are separated, and the USB gender is connected.

15. A vehicle comprising a universal serial bus including
a main body including a plurality of USB (Universal Serial Bus) terminals disposed on a circumference of an upper and a side surface of a housing;
a storage portion that is buried inside an interior trim to accommodate the main body in an inner space; and
a cable that electrically connects a power supply and the main body, and
wherein the main body is used in a state connected to the storage portion or moved to a state separated from the storage portion and connected to at least one smart device through the plurality of USB terminals.

16. The vehicle of claim 15, wherein the universal serial bus is installed in at least one of an indoor dashboard and a console box.

* * * * *